Figure 1:
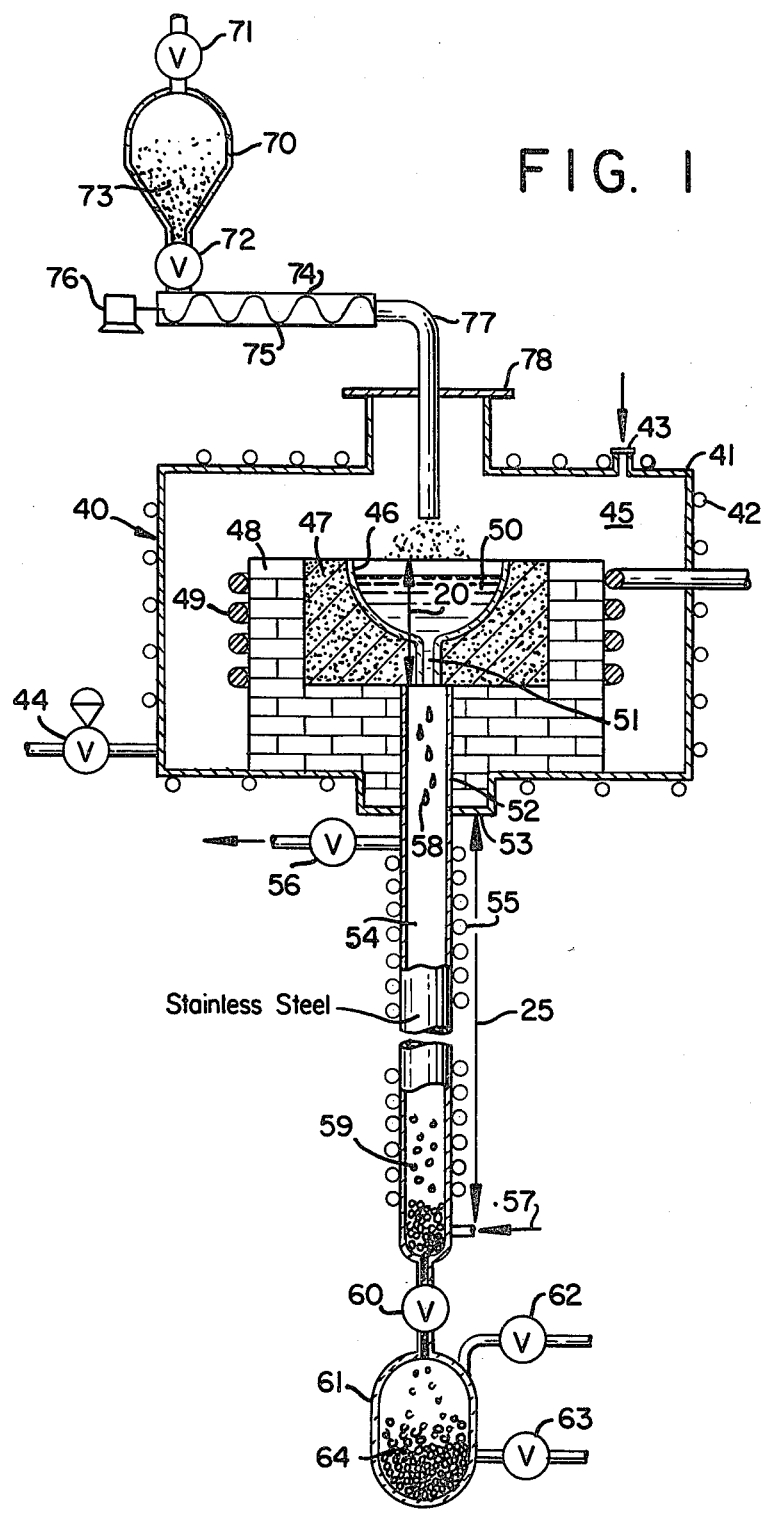

United States Patent [19]

Iya

[11] 4,354,987
[45] Oct. 19, 1982

[54] CONSOLIDATION OF HIGH PURITY SILICON POWDER

[75] Inventor: Sridhar K. Iya, Williamsville, N.Y.

[73] Assignee: Union Carbide Corporation, Danbury, Conn.

[21] Appl. No.: 249,443

[22] Filed: Mar. 31, 1981

[51] Int. Cl.³ .............................................. B01J 2/04
[52] U.S. Cl. ........................................ 264/13; 264/14
[58] Field of Search .................................... 264/13, 14

[56] References Cited

U.S. PATENT DOCUMENTS

| | | | |
|---|---|---|---|
| 2,257,878 | 4/1939 | Brennan | 83/91 |
| 2,919,471 | 4/1958 | Hechinger | 18/47.2 |
| 3,367,394 | 2/1968 | Roder et al. | 164/46 |
| 3,675,709 | 7/1972 | Vogerl et al. | 164/335 |
| 3,840,623 | 10/1974 | Olsson et al. | 264/13 |
| 3,911,994 | 10/1975 | Truman | 164/72 |
| 4,097,584 | 6/1978 | Reuschel et al. | 423/348 |
| 4,188,177 | 2/1980 | Kilby et al. | 264/13 |

OTHER PUBLICATIONS

Electronics/Oct. 26, 1978, p. 68, "Silicon Casting Promises Lower-Cost Photovoltaic Cells".
Brodkey, R. S.; The Phenomena of Fluid Motions, 1967, Addison-Wesley Publishing Company, Chapter 17.

Primary Examiner—James R. Hall
Attorney, Agent, or Firm—Frederick J. McCarthy, Jr.

[57] ABSTRACT

Consolidation of very fine silicon powder into shotted form using heated crucible.

6 Claims, 2 Drawing Figures

CONSOLIDATION OF HIGH PURITY SILICON POWDER

STATEMENT

The invention described herein was made in the performance of work under NASA Contract Number NAS 7-100, JPL No. 954334, for high purity silicon, and is subject to the provisions of Section 305 of the National Aeronautics and Space Art of 1958 (72 Stat. 435; 42 U.S.C. 2457).

The present invention is directed to the consolidation of silicon powder. More particularly the present invention is directed to the consolidation of very fine, e.g., micron and sub-micron size, particles of high purity silicon.

A presently known ultrahigh purity silicon production process (described in the published Progress Reports (1978-80) under DOE/JPL contract 954,334) involve the hydrogenation of metallurgical grade silicon feedstock with silicon tetrachloride and hydrogen to produce a mixture of chlorosilane intermediates. During the hydrogenation reaction, most of the impurities in the metallurgical grade silicon are precipitated so that they can be removed from the process. The chlorosilane intermediate feedstock is passed to an appropriate redistribution reactor and distillation column section whereby the chlorosilanes are progressively upgraded to high hydrogen content compounds with ultimate removal of the product silane and recycle silicon tetrachloride. Part of the processing arrangement involves the removal of volatile impurities by utilizing an appropriate stripping column and by reaction with the catalytic resin material. The ultrahigh purity silane material is employed as the feed to a pyrolysis section of the process. At this point of the process, a technique can be used which involves the homogeneous reaction of the high purity silane in a free space reactor so that the silane decomposes into its hydrogen and silicon components as described in the Final Report of DOE/JPL Contract 954334 June 19, 1979 and the resultant by-product hydrogen from the decomposition is presently recycled. The silicon component formed during silane decomposition is a high purity powder formed of ultrafine polycrystalline silicon particles of submicron size, low bulk density and high surface area. Due to these characteristics of the ultrafine silicon powder, the material is difficult to handle not only because of its bulk density properties but because it is readily contaminated unless stringent precautions are taken. Such contamination would negate the very purpose of the aforementioned process which is to upgrade metallurgical grade silicon feedstock material to ultrahigh purity silicon suitable for subsequent solar and electronic uses. The silicon powder, when intended for use in semiconductor applications has a total impurity content of less than about 10 ppb, e.g, of phosphorus, boron and exhibits a resistivity about 100 ohm-cm or better in the form of single crystalline material pulled from a melt. For solar uses, the silicon powder has a total impurity content of less than about 5 ppm and exhibits a resistivity of about 10 ohm-cm or better.

It is an object of this invention to provide an improved method of consolidating the ultrafine powder obtained from the homogeneous pyrolysis of silane.

It is another object of the invention to provide an improved silicon powder consolidation method which avoids handling and contamination problems otherwise associated with such powder material.

It is another object of the invention to provide an improved powder consolidation method that converts ultrafine powder to shot material that is easy to handle.

Figure 2:
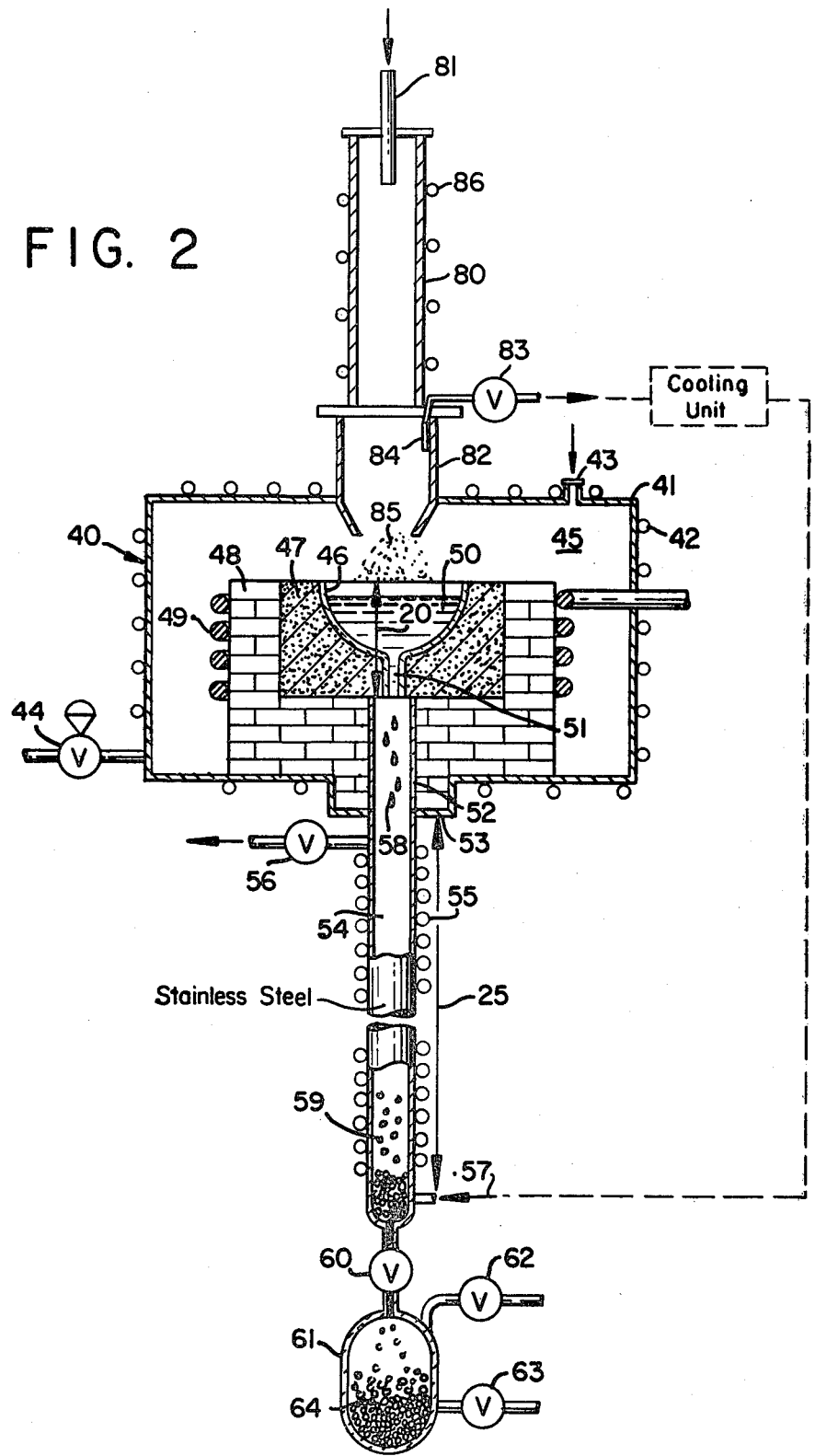

Other objects will be apparent from the following description and claims taken in conjunction with the drawing wherein:

FIG. 1 shows an equipment arrangement for silicon powder crucible shotting using ultrafine silicon powder feedstock and FIG. 2 shows an equipment arrangement for silicon powder crucible shotting using silane as the feedstock.

The present invention involves an improved crucible shotting method to consolidate the ultrafine powder available from the homogeneous pyrolysis of silane. The technique converts the high purity ultrafine, low bulk density, high surface area, easily contaminated powder into a high purity silicon shot material that has good handling characteristics.

In a particular embodiment the improved silicon powder consolidation method of the present invention includes the use of a quartz crucible to contain melted silicon powder and the resultant silicon melt passes through one or more suitable apertures in the bottom of the quartz crucible to form discrete molten droplets. The molten droplets are then cooled in a suitable cooling tower positioned beneath the crucible to form high purity silicon shot material.

The ultrafine powder material can be introduced to the melting crucible by suitable powder conveyor equipment. The conveyor equipment can use positive feed techniques to handle the otherwise difficult flowing material. Another preferred embodiment is to mount a reactor for the homogenous decomposition of the silane gas above the crucible and thereby introduce the resultant powder directly from the reactor. The quartz crucible is supported by a suitable susceptor, e.g., carbon which can be heated either resistively or preferably inductively by suitable electrical power source. The melting chamber containing the crucible is suitably purged by non-reactive purge gas such as argon, helium or hydrogen to vent any impurities that may vaporize from the equipment or melting powder. Preferably the purge gas is the hydrogen fluid obtained from the homogeneous pyrolysis of the ultrahigh purity silane itself. The molten droplets exiting from the curcible aperture are cooled in a cooling tower to the extent that they retain their integrity when they drop to the bottom of the tower. The tower contains an non-reactive gas such as argon, helium or hydrogen; preferably hydrogen which is obtained from the powder-forming homogeneous pyrolysis of silane. The cooled shot material at the bottom of the tower can be removed by an appropriate hopper arrangement and can then be stored and handled as desired without adverse factors related to low bulk density and high surface area otherwise associated with the ultrafine powder.

The basic crucible shotting arrangement as described above, can include multiple apertures on the bottom of the crucible for increased throughput. The number and size of these apertures would be a function of desired shot size, heating equipment capability and material throughput requirements. Generally it is considered that one, two or three apertures are suitable and that these apertures are substantially circular in cross-section and range from about 0.5 to 2 mm in diameter. The melt flow conditions through the aperture or apertures are preferably in a varicose jet region as bounded by the discrete drop formation region and the sinuous jet region as is known to the art and described in "Phenomena of Fluid Motions" Brodky, Addison-Wesley (1967) at pp 540 et seg. Such operation in the varicose region is to provide shot diameters about twice that of the aperture. The material throughput through the aperture will be a function of the pressure differential between the upper melt surface and the aperture outlet i.e. the melt height in the crucible above the aperture and the gas pressure above the melt which can be regulated to control melt flow through the aperture. Utilizing cooling gases, such as argon, helium and hydrogen should enable cooling tower heights ranging from 10 to 100 feet high depending on the degree of solidification of the shot.

The preferred purge and cooling gas for this improved crucible shotting arrangement is the hydrogen obtained from the silane pyrolysis i.e. the same gas available during the pyrolysis formation of the ultrafine silicon powder and possible product contamination is thereby minimized. Additionally, the use of hydrogen has the advantages of minimizing shotting tower heights due to its known favorable cooling characteristics.

With reference to FIG. 1 fine powder obtained directly by pyrolysis of silane is provided in an appropriate bin or hopper 70 which feeds a suitable powder conveyor 74. The control of the ultrafine silicon powder 73 into and out of its storage hopper can be regulated by manipulation of valves 71 and 72.

The powder is obtained from a homogeneous decomposition of silane whereby the silane is maintained at temperature and pressure conditions such that the silane is directly decomposed into the hydrogen gas and solid silicon. Such a homogeneous decomposition is referred to as decomposition in a free space reactor and results in the formation of minute ultrafine silicon powder formed of particles in the micron to submicron size range as previously mentioned. Such powder is characterized by a surface area in the range of about 25 to 2.5 $m^2/gm$, typically 7 $m^2/gm$; an average particle size in the range of 0.1 to 1 micron typically 0.4 micron; and a bulk density of 0.03 to 0.2 gm/cc typically 0.08 gm/cc.

Powder conveyor 74 is utilized since the ultrafine powders do not have good flow characteristics and it is necessary to have a suitable direct feed arrangement. The feed conveyor involves auger or rotating screw 75 driven by motor means 76. The ultrafine powder is thereby forced at a controlled rate through suitable inlet tube 77 suitably formed of quartz material. This tube passes through tube manifold means 78 and thereby introduces the powder to the heating zone 20 wherein the silicon particles melt and form a pool of molten silicon 50 in crucible 46 at the temperature of the heated zone with additional powder being added to the top of the polysilicon melt 50 contained in quartz crucible 46 and thereby melted. The heating zone 20 is maintained at a temperature in the range of about 1425° C. to 1600° C. The quartz crucible 46 is supported by carbon block 47 formed to gas-tightly support the crucible 46 with only an opening for crucible bottom aperture 51. The graphite block 47 is suitably insulated by surrounding fire brick 48 or other suitable high temperature insulation. The entire arrangement is arranged so that induction coil 49 can be utilized with suitable electrical power connections to heat the carbon or graphite block 47 and thereby supply the heat energy necessary to establish the heating zone 20 for melting the silicon powder introduced to the quartz crucible 46. The entire melting arrangement is contained within a steel vessel 41 which has suitable cooling coils 42 which can be used to carry suitable coolant such as water. The unit is further purged with suitable gas by inletting the gas at 43 and exiting at 44 with suitable positive pressure regulation. The purge gas has the purpose of maintaining a controlled atmosphere and pressure during the melting of the silicon powder and additionally it carries away any volatile impurities that may evolve from the equipment and silicon powder during the melting process. The entire crucible melting arrangement 40 is positioned so that it is placed vertically above the cooling tower 54 associated with the process arrangement. The cooling tower 54 includes a quartz liner 52 at the bottom of the melting chamber and associated manifold structure 53. This liner is then connected to a suitable cooling tower 54 of sufficient length so that molten silicon droplets 58 exiting from the bottom aperture of the crucible can free fall through the cooling tower and be cooled to achieve at least peripheral solidification during the drop. The at least partically solidified silicon droplets or pellets or shot material 59, e.g. 50% by weight solidified, are collected at the bottom of the cooling tower 54. The cooling tower 54 is cooled by suitable cooling coils 55 surrounding the circumference of the tower and additionally the tower is purged with suitable non-reactive cooling gas through inlet 57 and exit 56 to provide a silicon shot surface temperature in cooling zone 25 of not more than about 1400° C., suitably about 1000° C. to 1400° C. The shotted material in hopper 61 can be cooled to ambient by cooling gas. The cooling gas is preferably the same inert, i.e. non-reactive gas that is utilized to purge the melting chamber 40 and preferably is the same hydrogen gas that is obtained from silane pyrolysis. At the bottom of the cooling tower, the consolidated solidified shot material 64 is collected in suitable hopper 61 which is connected to the tower bottom by valve means 60 and includes valve means 62 and 63 to purge the vessel with gas and maintain a controlled gas atmosphere in the hopper arrangement.

The physical size of the shotting product is determined in accordance with known techniques e.g. by the type and size of the aperture 51 at the bottom of the quartz crucible combined with the height of the silicon melt material 50 above that aperture combined with the gas pressure differential between the upper surface of the molten silicon pool 50 and the outlet of aperture 51. These parameters can be adjusted in order to control the size of the molten droplet and throughput or number of droplets or shot pellets formed in accordance with techniques known to the art. The most desirable condition for silicon melt flow through a crucible aperture, as noted hereinabove, is bounded by a jet velocity which is intermediate to the drop formation region associated with very uniform discrete drops and the sinuous region which is associated with a wavy jet exiting from the aperture and then breaking up into individual droplets as described in the aforementioned text—"Phenomena of Fluid Motions". The intermediate varicose region is associated with a relatively steady jet exiting from the aperture and the breaking up of the stream into relatively uniform droplets which have been estimated to be of a diameter about twice that of the crucible aperture diameter. Within the varicose fluid region, it has been determined that the shotting rate or melt throughput rate can be controlled by the melt driving force through the aperture as determined by a combination of aperture melt height and gas pressure differential noted above. Typical flow condition calculations have indicated that orifice diameter of about 1 mm should result in solidified shot pellets of about 2 mm diameter. With a static pressure head equivalent to about 10 inches of silicon melt above the aperture, it can be expected that the shot production rate would correspond to about 16 kg/hr. It is preferred that the temperature of the melt adjacent the exit aperture 51 be about 1425° C. whereas the temperature at the top surface of the melt 50 be at a higher level of about 1550° to 1600° C. This can be accomplished by arranging coils 49 in a configuration which establishes higher flux coupling in the vicinity of the top of crucible 46. Alternately, separate upper and lower independently controlled coils could be used. Such conditions are to enable the efficient and rapid melting of silicon powder being deposited on the higher temperature surface of the melt 50 while avoiding a higher than necessary temperature in the exiting droplets so that solidification is more efficiently effected in the cooling zone 25. Additionally, the lower coil can be utilized as an ON/OFF control for the flow of molten silicon through the aperture. In order to solidify the silicon metl exiting from the aperture, it is necessary to have sufficient falling height within the cooling tower to at least form sufficient solid shell or crust on the droplet to avoid significant deformation upon dropping to the bottom. It is estimated that about 50% or more solidification would be sufficient. The degree of solidification is a function of the heat transfer characteristics of the gas within the cooling tower. Generally, inert gas such as argon has less favorable heat transfer characteristics compared to helium or hydrogen. For example, it is estimated that for 2 mm diameter shot, utilizing region gas would require about 30 ft. tower height for 50% solidification whereas helium would require about 7 ft. and hydrogen only about 5 ft. For complete solidification, it is estimated that argon, helium and hydrogen would require tower heights of 85, 25 and 20 ft. respectively. It is evident that hydrogen is the preferred cooling fluid. This situation is advantageous in that hydrogen is the fluid obtained from silane pyrolysis and from the standpoint of minimal contamination of silicon it is most desirable to utilize the same gas obtained during the formation of the silicon powder. Hence, it is most desirable to use by-product hydrogen as the purge gas within the melting chamber 40 and as the cooling gas within shot cooling tower 54. This situation leads to the combined advantages of low required tower heights because of favorable heat transfer characteristics associated with hydrogen and minimal amount of contamination of the power by virtue of utilizing the same gas obtained during powder formation.

Although the invention has been described starting with the flow of silicon powder, it would be most advantageous to avoid any intermediate processing whatsoever of the powder. Such a preferred embodiment is illustrated in FIG. 2 which shows a free space type reactor 80 in combination with the melting chamber and shotting tower associated with the crucible shotting technique of FIG. 1. The free space reactor 80 is illustrated schematically to show the unit with heating means 86 and silane introduction nozzle 81. Within the reactor, silane is decomposed by pyrolysis to form silicon powder and by-product hydrogen gas. The utrafine silicon powder is collected in quartz funnel arrangement 82 and passed through opening 85 to the melting crucible. The by-product hydrogen formed from in the pyrolysis decomposition is filtered in unit 84 and removed through conduit 83 for purge, cooling and recycle purposes.

Although the foregoing crucible shotting technique has been described with physical arrangement utilizing a single bottom aperture in the melting crucible, it is apparent that it is possible to utilize basically the same arrangement with multiple apertures. It would be possible to utilize more than one bottom aperture with corresponding shot tower capacity to handle the exiting droplets to increase through-put. It is expected that aperture sizes ranging from about ½ mm to as high as 4 mm may be acceptable but preferred ranges would be 1 to 2 mm aperture diameter. Larger apertures result in larger droplets and thereby require a taller tower for cooling purposes, the smaller size ranges are accordingly preferred.

Alternately, the heat input to the silicon powder can be direct inductive coupling to the silicon melt pool. For startup, this method will require an electrical conductor, such as molybdenum wire, within the crucible to heat and melt the silicon powder. When the initial powder is melted, the electrical conductor can be removed for continued melting operation. This alternate method has the advantages of cooler crucible wall temperatures to extend crucible life and increased silicon melt rates.

What is claimed is:

1. Method for obtaining high purity silicon in shotted form by consolidating a powder formed of fine size particles of high purity silicon formed by the pyrolysis of high purity silane, said method comprising:
   (i) introducing a flow of powder formed of said particles into a heated zone which is at a temperature sufficient to melt the particles,
   (ii) collecting the particles in a crucible which is positioned in the heated zone and which is essentially inert to melted silicon particles so as to establish a pool of molten silicon in said crucible, into which pool additional particles are added and melted,
   (iii) providing an aperture in said crucible below the surface of the pool of molten silicon,
   (iv) establishing a pressure differential between the upper surface of said pool of molten silicon and said aperture sufficient to cause molten silicon to exit said aperture in a relatively steady jet which breaks up into a train of discrete molten droplets, having a diameter about two times that of said aperture,
   (v) causing said discrete molten droplets to pass through a cooling zone containing a cooling gas which is essentially non-reactive with said molten droplets and which is at a temperature sufficient to solidify at least the outer peripheral portion of said droplets to provide silicon in shotted form having a purity essentially the same as that of said powder.

2. Method in accordance with claim 1 wherein the upper surface of said molten pool of silicon is at a temperature in the range of about 1500° to 1600° C. and the temperature of the molten pool of silicon adjacent said aperture is in the range of about 1425° to 1450° C.

3. Method in accordance with claim 1 wherein said aperture is substantially circular in cross-section having a diameter of about 0.5 to 2 mm.

4. Method in accordance with claim 2 wherein said aperture is substantially circular in cross-section having a diameter of about 0.5 to 2 mm.

5. Method for obtaining high purity silicon in shotted form by consolidating a powder formed of fine sized particles of high purity polycrystalline silicon formed by the pyrolysis of high purity silane, said powder having a bulk density of about 0.03 to 0.2 gm/cc a surface area in the range of about 25 to 2.5 m$^2$/gm and a particle size of about 0.1 to 1 micron, (i) introducing a flow of powder formed of said particles and by-product hydrogen gas into a chamber containing a heated zone which is at a temperature sufficient to melt the particles, said by-product hydrogen gas being at a pressure sufficient to maintain a positive pressure within said chamber (ii) collecting the particles in a crucible made of a material which is positioned in the heated zone and which is essentially inert to melted silicon particles so as to establish a pool of molten silicon in said crucible, (iii) providing an aperture in said crucible below the surface of the pool of molten silicon, into which pool additional particles are added and melted (iv) establishing a pressure differential between the upper surface of said pool of molten silicon and said aperture sufficient to cause molten silicon to exit said aperture in a relatively steady jet which breaks up into a train of discrete molten droplets, having a diameter about two times that of said aperture (v) causing said discrete molten droplets to pass through a cooling zone containing by-product hydrogen gas which is at a temperature sufficient to solidify at least the outer peripheral portion of said droplets to provide silicon in heated form having a purity essentially the same as that of said powder particles.

6. Method in accordance with claim 1 wherein the heated zone is maintained by inductively coupling to the silicon melt pool.

* * * * *